(12) United States Patent
Baek et al.

(10) Patent No.: US 9,894,496 B2
(45) Date of Patent: Feb. 13, 2018

(54) METHOD AND TERMINAL FOR PROVIDING MCPTT SERVICE

(71) Applicant: SAMSUNG ELECTRONICS CO., LTD., Suwon-si (KR)

(72) Inventors: Yun-sun Baek, Suwon-si (KR); Kill-yeon Kim, Suwon-si (KR); Duk-gu Sung, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 15/436,098

(22) Filed: Feb. 17, 2017

(65) Prior Publication Data

US 2017/0245123 A1  Aug. 24, 2017

Related U.S. Application Data

(60) Provisional application No. 62/296,717, filed on Feb. 18, 2016.

(30) Foreign Application Priority Data

Feb. 15, 2017 (KR) .......................... 10-2017-0020707

(51) Int. Cl.
*H04B 7/00* (2006.01)
*H04W 4/10* (2009.01)
(Continued)

(52) U.S. Cl.
CPC .............. *H04W 4/10* (2013.01); *H04W 4/08* (2013.01); *H04W 4/22* (2013.01); *H04W 76/005* (2013.01); *H04W 88/02* (2013.01)

(58) Field of Classification Search
CPC ........... H04W 4/10; H04W 4/08; H04W 4/22; H04W 76/005; H04W 88/02
(Continued)

(56) References Cited

U.S. PATENT DOCUMENTS

| 7,693,533 B2 * | 4/2010 | Sung | ...................... H04W 4/10 370/260 |
| 7,933,621 B1 * | 4/2011 | Vu | .......................... H04W 4/08 455/518 |

(Continued)

FOREIGN PATENT DOCUMENTS

| KR | 10-2006-0019458 A | 3/2006 |
| WO | 2008/082203 A1 | 7/2008 |

OTHER PUBLICATIONS

3rd Generation Partnership Project; Technical Specification Group Core Network and Terminals Mission Critical Push to Talk (MCPTT) media plane control; Protocol specification (Release 13), Jan. 2016, 179 pages total, v1.1.0, Jan. 2016, Valbonne, France.

(Continued)

*Primary Examiner* — Sonny Trinh
(74) *Attorney, Agent, or Firm* — Sughrue Mion, PLLC

(57) ABSTRACT

Disclosed is a method in which a terminal provides a Mission Critical Push To Talk (MCPTT) service. The method includes receiving a group call announcement message by the terminal, which is any one of a plurality of terminals participating in a group call that is set based on the MCPTT service, comparing information regarding a first group call stored in the terminal with information regarding a second group call included in the received group call announcement message, and merging the first group call, in which the terminal is participating, and the second group call, based on a result of the comparison.

13 Claims, 17 Drawing Sheets

(51) Int. Cl.
*H04W 4/08* (2009.01)
*H04W 4/22* (2009.01)
*H04W 76/00* (2009.01)
*H04W 88/02* (2009.01)

(58) Field of Classification Search
USPC .................................................. 455/518, 519
See application file for complete search history.

(56) References Cited

U.S. PATENT DOCUMENTS

| 8,982,763 | B2* | 3/2015 | Ofir | H04W 4/10 370/312 |
|---|---|---|---|---|
| 9,510,166 | B1* | 11/2016 | Allen | H04W 4/10 |
| 2016/0302048 | A1* | 10/2016 | Suzuki | H04W 4/10 |

OTHER PUBLICATIONS

Rosenberg et al., "SIP: Session Initiation Protocol", Network Working Group, Jun. 2002, 269 pages total, p. 1-p. 269, RFC 3261, The Internet Society.

Huitema et al., "Real Time Control Protocol (RTCP) attribute in Session Description Protocol (SDP)", Network Working Group, Oct. 2003, 8 pages total, p. 1-p. 8, The Internet Society.

Handley et al., "SDP: Session Description Protocol", Network Working Group, Jul. 2006, 49 pages total, p. 1-p. 49, The Internet Society.

Search Report dated Jun. 8, 2017, issued by the International Searching Authority in counterpart International Patent Application No. PCT/KR2017/001770 (PCT/ISA/210).

Written Opinion dated Jun. 8, 2017, issued by the International Searching Authority in counterpart International Patent Application No. PCT/KR2017/001770 (PCT/ISA/237).

* cited by examiner

FIG. 6

| IEI | INFORMATION ELEMENT | TYPE/REFERENCE | PRESENCE | FORMAT | LENGTH |
|---|---|---|---|---|---|
| | GROUP CALL PROBE MESSAGE IDENTITY | MESSAGE TYPE | M | V | 1 |
| | MCPTT GROUP ID | MCPTT GROUP ID | M | LV-E | 3-x |

| | 610 | 620 | 630 | 640 | 650 |

| IEI | INFORMATION ELEMENT | TYPE/REFERENCE | PRESENCE | FORMAT | LENGTH |
|---|---|---|---|---|---|
| | GROUP CALL ANOUNCEMENT MESSAGE IDENTITY | MESSAGE TYPE | M | V | 1 |
| | CALL IDENTIFIER | CALL IDENTIFIER | M | LV-E | 3-x |
| | CALL TYPE | CALL TYPE | M | V | 1 |
| | REFRESH INTERVAL | REFRESH INTERVAL | M | V | 2 |
| | MCPTT MCPTT GROUP ID | MCPTT GROUP ID | M | LV-E | 3-x |
| | SDP | SDP | M | LV-E | 3-x |
| | ORIGINATING MCPTT USER ID | MCPTT USER ID | M | LV-E | 3-x |
| | CALL START TIME | CALL START TIME | M | V | 5 |
| | LAST PRIORITY CHANGE TIME | LAST PRIORITY CHANGE TIME | M | V | 5 |
| | LAST USER TO CHANGE PRIORITY | MCPTT USER ID | M | LV | 3-x |
| | CONFIRM MODE INDICATION | CONFIRMATION MODE INDICATION | O | TV | 1 |
| | PROBE RESPONSE | PROBE RESPONSE | O | TV | 1 |

| IEI | INFORMATION ELEMENT | TYPE/REFERENCE | PRESENCE | FORMAT | LENGTH |
|---|---|---|---|---|---|
| | GROUP CALL ACCEPT MESSAGE IDENTITY | MESSAGE TYPE | M | V | 1 |
| | CALL IDENTIFIER | CALL IDENTIFIER | M | V | 2 |
| | CALL TYPE | CALL TYPE | M | V | 1 |
| | MCPTT GROUP ID | MCPTT GROUP ID | M | LV-E | 3-x |
| | SENDING MCPTT USER ID | MCPTT USER ID | M | LV-E | 3-x |

| IEI | INFORMATION ELEMENT | TYPE/REFERENCE | PRESENCE | FORMAT | LENGTH |
|---|---|---|---|---|---|
| | GROUP CALL IMMINENT PERIL END MESSAGE IDENTITY | MESSAGE TYPE | M | V | 1 |
| | CALL IDENTIFIER | CALL IDENTIFIER | M | V | 2 |
| | MCPTT GROUP ID | MCPTT GROUP ID | M | LV-E | 3-x |
| | SENDING MCPTT USER ID | MCPTT GROUP ID | M | LV-E | 3-x |
| | LAST PRIORITY CHANGE TIME | LAST PRIORITY CHANGE TIME | M | V | 5 |
| | LAST USER TO CHANGE PRIORITY | MCPTT USER ID | M | LV | 3-x |

| IEI | INFORMATION ELEMENT | TYPE/REFERENCE | PRESENCE | FORMAT | LENGTH |
|---|---|---|---|---|---|
| | GROUP CALL ANOUNCEMENT MESSAGE IDENTITY | MESSAGE TYPE | M | V | 1 |
| | CALL IDENTIFIER | CALL IDENTIFIER | M | V | 2 |
| | MCPTT GROUP ID | MCPTT GROUP ID | M | LV-E | 3-x |
| | SENDING MCPTT USER ID | MCPTT USER ID | M | LV-E | 3-x |
| | LAST PRIORITY CHANGE TIME | LAST PRIORITY CHANGE TIME | M | V | 5 |
| | LAST USER TO CHANGE PRIORITY | MCPTT USER ID | M | LV | 3-x |

1010  1020  1030  1040  1050

FIG. 13
```
BITS
8  7  6  5  4  3  2  1
0  0  0  0  0  0  0  1    PROBE GROUP CALL
0  0  0  0  0  0  1  0    ANNOUNCE GROUP CALL
0  0  0  0  0  0  1  1    ACCEPT GROUP CALL
0  0  0  0  0  1  0  0    END GROUP CALL IN EMERGENCY
0  0  0  0  0  1  0  1    END GROUP CALL IN IMMINENT PERIL
0  0  0  0  0  1  1  0    BROADCAST GROUP CALL
0  0  0  0  0  1  1  1    END BROADCASTING OF GROUP CALL
ALL OTHER VALUES ARE RESERVED
```
1300
FIG. 14
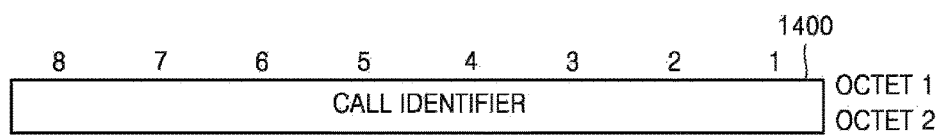
FIG. 15
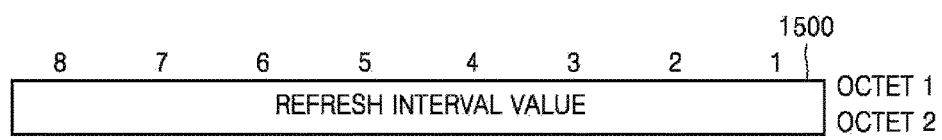

METHOD AND TERMINAL FOR PROVIDING MCPTT SERVICE

CROSS-REFERENCE TO RELATED APPLICATION

This application claims the benefit of U.S. Provisional Application No. 62/296,717, filed on Feb. 18, 2016, in the United States Patent and Trademark Office, and Korean Patent Application No. 10-2017-0020707, filed on Feb. 15, 2017 in the Korea Patent Office, the disclosure of which is incorporated herein in its entirety by reference.

BACKGROUND

1. Field

The present disclosure relates to a method of providing an MCPTT service, a terminal for providing an MCPTT service, and a computer-readable recording medium having a program recorded thereon for executing a method of providing an MCPTT service.

2. Description of the Related Art

In recent years, there has been increased interest in a public safety network for providing communication services in emergency situations such as disasters. In a case of such a special dedicated communication service, communication may be performed based on a service such as push-to-talk (PTT). In the case of a PTT-based communication service, only a terminal that has acquired a floor may send talk bursts (e.g., media transmission).

In a case of a public safety network, network resources such as a server may not be supported, and thus off-network situations in which there is no central controller should be considered. That is, for a public safety network, a terminal-to-terminal communication should be considered.

Thus, in order to implement an off-network PTT-based communication service, it is necessary to research and develop a process for controlling call setup, floor, etc.

SUMMARY

Provided are a method and terminal for providing a Mission Critical Push To Talk (MCPTT) service for controlling a call start, a call state change, a call merging, etc., which may occur in an MCPTT service which is provided in an off-network situation.

Additional aspects will be set forth in part in the description which follows and, in part, will be apparent from the description, or may be learned by practice of the presented exemplary embodiments.

According to an aspect of an exemplary embodiment, a method in which a terminal provides an MCPTT service includes receiving a group call announcement message, by the terminal, which is any one of a plurality of terminals participating in a group call that is set based on the MCPTT service; comparing information regarding a first group call stored in the terminal with information regarding a second group call included in the received group call announcement message; and merging the first group call, in which the terminal is participating, and the second group call, based on a result of the comparison.

According to an aspect of another exemplary embodiment, a terminal that provides an MCPTT service, which is any one of a plurality of terminals participating in a group call that is set based on the MCPTT service, includes a communicator configured to receive a group call announcement message; and a processor configured to compare information regarding a first group call stored in the terminal with information regarding a second group call included in the received group call announcement message and merge the first group call, in which the terminal is participating, and the second group call, based on a result of the comparison.

According to an aspect of another exemplary embodiment, a method in which a terminal provides a MCPTT service includes receiving a group call announcement message by the terminal, which is any one of a plurality of terminals participating in a first group call that is set based on the MCPTT service; comparing information regarding the first group call stored in the terminal with information regarding a second group call included in the received group call announcement message; and merging the first group call, in which the terminal is participating, and the second group call, the merging being based on a result of the comparing information regarding the first group call stored in the terminal with information regarding the second group call included in the received group call announcement message.

According to an aspect of another exemplary embodiment, a terminal that provides a MCPTT service, which is any one of a plurality of terminals participating in a first group call that is set based on the MCPTT service, includes a communicator configured to receive a group call announcement message; and at least one processor configured to compare information regarding the first group call stored in the terminal with information regarding a second group call included in the received group call announcement message and to merge the first group call, in which the terminal is participating, and the second group call, the at least one processor is configured to merge based on a result of comparing information regarding the first group call stored in the terminal with information regarding the second group call included in the received group call announcement message.

BRIEF DESCRIPTION OF THE DRAWINGS

These and/or other aspects will become apparent and more readily appreciated from the following description of the exemplary embodiments, taken in conjunction with the accompanying drawings in which:

FIG. 6 is a table illustrating content included in a group call probe message according to an exemplary embodiment;

FIG. 7 is a table illustrating content included in a group call announcement message according to an exemplary embodiment;

FIG. 8 is a table illustrating content included in a group call acceptance message according to an exemplary embodiment;

FIG. 9 is a table illustrating content included in a group call imminent-peril end message according to an exemplary embodiment;

FIG. 10 is a table illustrating content included in a group call emergency end message according to an exemplary embodiment;

FIG. 13 is a table illustrating a message type according to an exemplary embodiment;

FIG. 14 is a diagram illustrating a call identifier according to an exemplary embodiment;

FIG. 15 is a diagram illustrating a refresh interval according to an exemplary embodiment;

DETAILED DESCRIPTION

Figure 1:
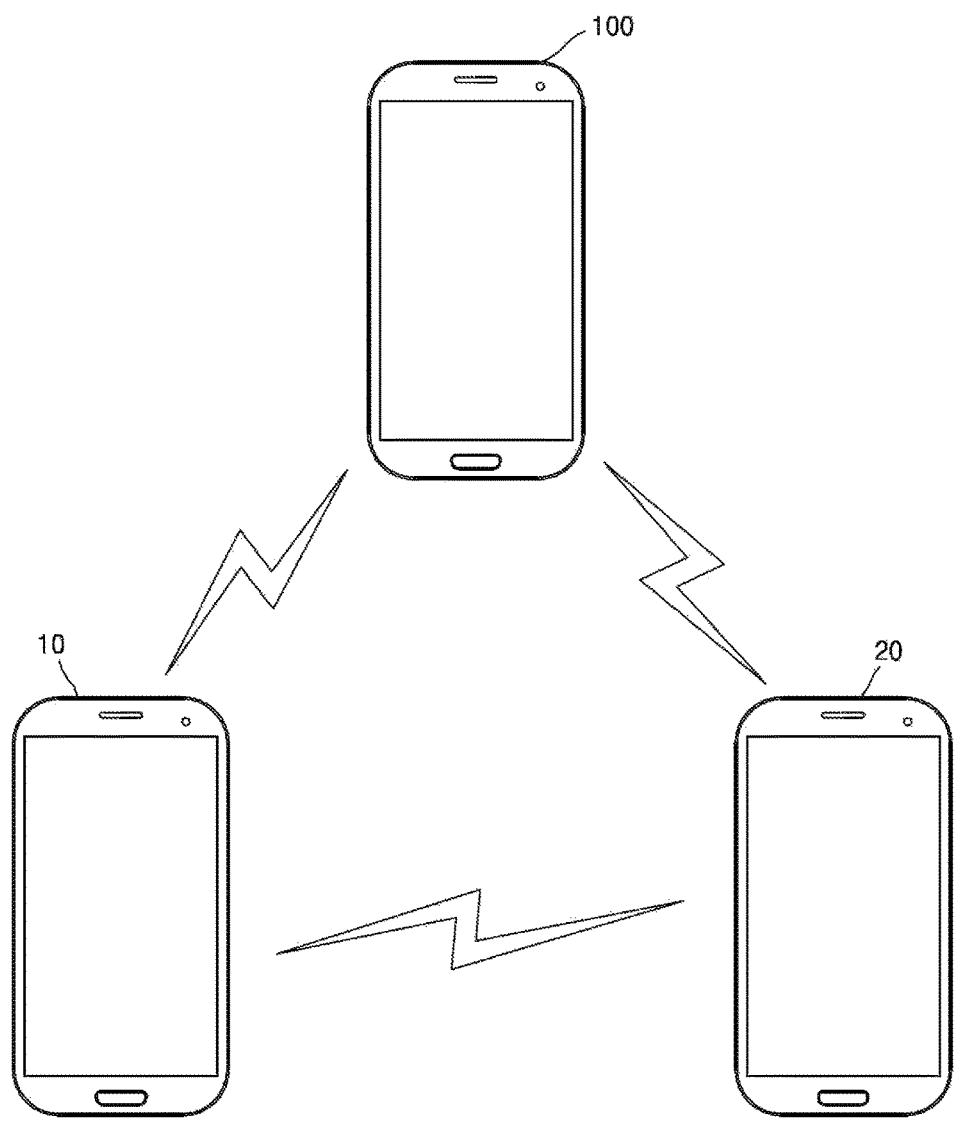
FIG. 1 is a conceptual diagram illustrating a method in which a terminal provides a Mission Critical Push To Talk (MCPTT) service according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and are not to be construed as being limited to the descriptions set forth herein. Accordingly, the exemplary embodiments are merely described below with reference to the figures to explain aspects. As used herein, the term "and/or" includes any and all combinations of one or more of the associated listed items. Expressions such as "at least one of," when preceding a list of elements, modify the entire list of elements and do not modify the individual elements of the list.

The terms used herein will be briefly described, and the present disclosure will be described in detail.

The terms used herein have been selected as general terms which are widely used at present in consideration of the functions of the present disclosure, and this may be altered according to the intent of an operator skilled in the art, conventional practice, or introduction of new technology. Also, in a case in which a term is arbitrarily selected by the applicant in a specific case, a meaning of the term will be described in detail in a corresponding description portion of the exemplary embodiments. Therefore, the terms used herein should be defined on the basis of the overall content of the present disclosure instead of a simple name of each of the terms.

Furthermore, when one part is referred to as "comprising" (or "including" or "having") other elements, it should be understood that the part can comprise (or include or have) only those elements or other elements as well as those elements unless specifically described otherwise. Moreover, each of terms such as "unit" and "module" described in the exemplary embodiments denotes an element for performing at least one function or operation, and may be implemented as hardware, software, or a combination of hardware and software.

In the following detailed description, only certain exemplary embodiments of the present disclosure will be shown and described simply by way of illustration. The present disclosure may, however, be embodied in many different forms and is not to be construed as being limited to the exemplary embodiments set forth herein. In the accompanying drawings, portions irrelevant to a description of the exemplary embodiments will be omitted for clarity. Moreover, like reference numerals refer to like elements throughout.

FIG. 1 is a conceptual diagram illustrating a method in which a terminal 100 provides a Mission Critical Push To Talk (MCPTT) service according to an embodiment.

Referring to FIG. 1, the terminal 100 according to an exemplary embodiment may provide the MCPTT service in an LTE-based public safety network, which is called a public safety LTE (hereinafter referred to as PS-LTE). The MCPTT service may support one-to-one and one-to-many voice/video communications. A user of the MCPTT service may start talking by pressing a "talk button" of the terminal 100. While a specified user speaks, the other users may listen to the specified user.

A network in which the MCPTT service is provided may have various types. For example, for an on-network type, which is a first type, like a cellular phone, a user may speak through support of network infrastructure such as a server. As another example, for an off-network situation, which is a second type, a user of the terminal 100 may talk directly without using the network infrastructure. That is, in the case of the off-network type, the user of the terminal 100 may talk according to a predetermined rule without a mediator that controls communication (i.e., approves of a floor) unlike the on-network type. Accordingly, the off-network type may be used for communication between users in an environment in which no network infrastructure has been established or a special situation in which appropriate support cannot be provided by network infrastructure.

For the MCPTT service in the off-network situation, a call setup process, which is a process of determining multimedia parameters and sharing the determined multimedia parameters among terminals, may be performed before private communication is performed. Here, the multimedia parameters may include audio/video codecs, a multimedia port, an encryption key, and so on. However, these are merely examples, and exemplary embodiments are not limited to those described above.

The terminal 100 according to an exemplary embodiment may wait until a group call announcement message is received from another terminal. The group call announcement message may include the parameters such as group identity, group call originating identity information, media type, a media codec, bandwidth, multicast port number for media, port number for floor control protocol, a decryption key for a media description if needed, and optionally a confirmation mode indication. These media parameters may be used in an MCPTT group call. When the announcement message is received, the terminal may configure its own parameters and join the announced MCPTT group call. A well-known protocol to be used for session negotiation is the Session Initiation Protocol (SIP) specified in RFC 3261. However, this protocol is not adequate for the off-network MCPTT service because the negotiation procedure may yield an unpredictable delay and may not work well under server-less environments. An objective of call setup for the off-network MCPTT service is to establish a call between terminals as quickly as possible.

In this embodiment, a message generated by the terminal 100 may be broadcast so that another terminal 10 or 20 or a device located in a coverage area of the terminal 100 or within a predetermined distance range from the terminal 100 may receive the message.

Also, a distributed direct session may be used to advertise multicast multimedia conferences and other multicast sessions and communicate relevant session setup information to participants. For example, a session directory may periodically multicast packets containing information regarding the session, and these advertisements may be received by potential remote participants. However, in the off-network type, terminals may communicate with other terminals in a coverage area of device to device (D2D) communication. Accordingly, it is necessary to merge two off-network group calls in order to solve a coverage issue made between fragmented groups in the off-network type.

A floor control method of the terminal 100 will be described below in detail with reference to FIGS. 2 to 28.

Figure 2:
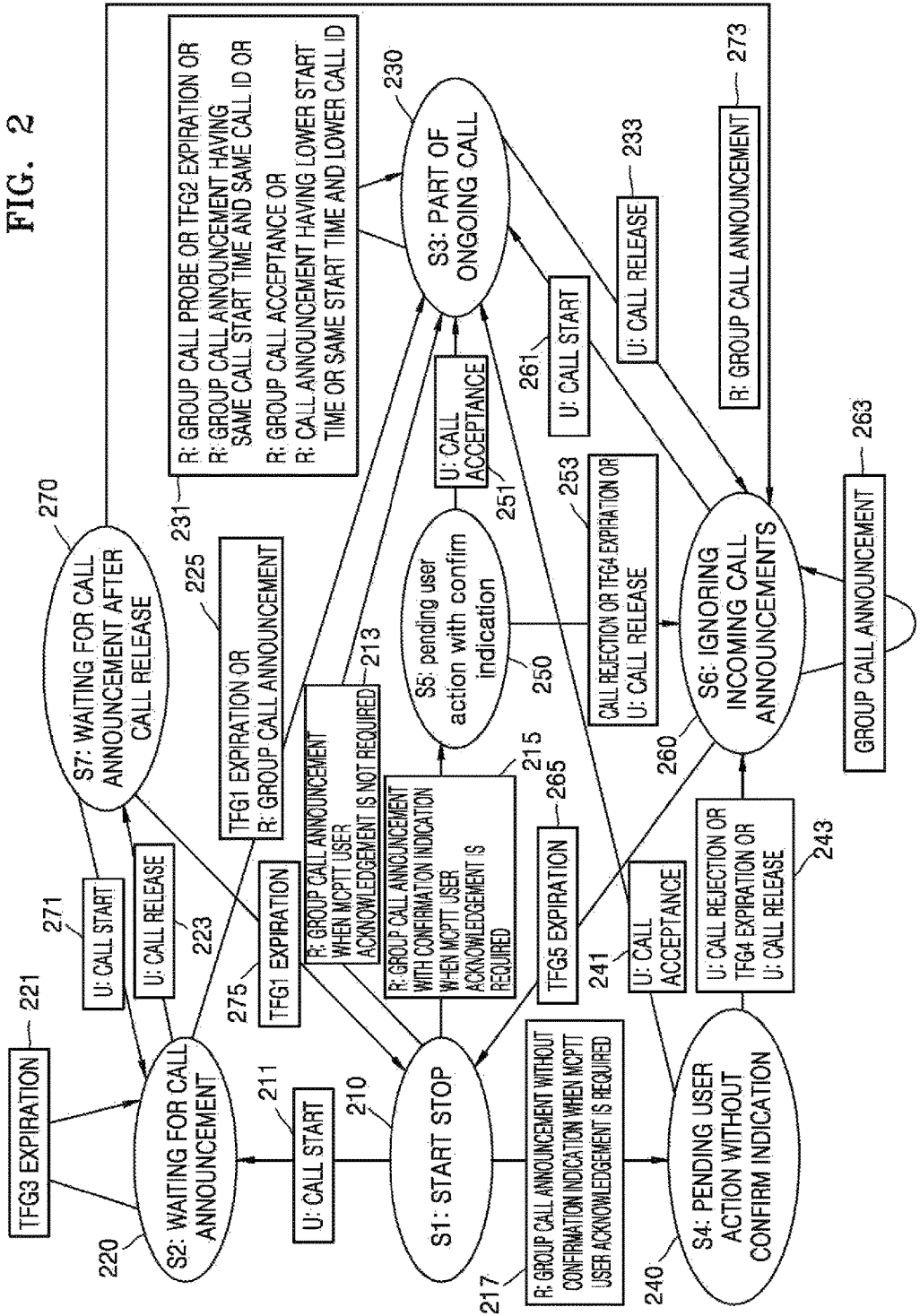
FIG. 2 is a state diagram illustrating a method in which a terminal communicates with another terminal according to an exemplary embodiment.

FIG. 2 is a state diagram illustrating a method in which the terminal 100 communicates with another terminal according to an embodiment.

The state diagram according to an exemplary embodiment may be generated for each MCPTT group ID. Also, media streams of an off-network group call cannot be modified and a Session Description Protocol (SDP) may be the same for the entire duration of the call. Information on the call such as a call identifier, a refresh interval, an SDP body, an originating MCPTT user ID, an MCPTT group ID, etc. may be present in association with the state diagram. While sensing a message to be described below in association with the call, an MCPTT client may provide a packet priority of a current Proximity-based Service (ProSe) associated with a call type control state machine to lower layers such as a physical layer among communication layers that support the MCPTT service.

Referring to FIG. 2, the terminal 100 may be present in any one of a plurality of states shown in the state diagram during a call control process.

In this embodiment, a start-stop state (hereinafter referred to as a state S1) (210) may exist when the terminal does not participate in an on-going call. A waiting-for-call-announcement state (hereinafter referred to as a state S2) (220) may exist when the terminal has sent a group call probe message and is waiting for a group call announcement message. A part-of-ongoing-call state (hereinafter referred to as a state S3) (230) may exist when the terminal participates in an ongoing call.

A pending-user-action-without-confirm-indication state (hereinafter referred to as a state S4) (240) may exist when the terminal has notified the MCPTT user of the terminal of the received group call announcement message and is not expected to send a confirm indication. A pending-user-action-with-confirm-indication state (hereinafter referred to as a state S5) (250) may exist when the terminal has notified the MCPTT user of the terminal of the received group call announcement message and is expected to send the confirm indication.

An ignoring-incoming-call-announcements state (hereinafter referred to as a state S6) (260) may exist when the group call was rejected or released, a group call announcement message was sent or received, and group call announcement messages continue being received. A waiting-for-call-announcement-after-call-release state (hereinafter referred to as a state S7) (270) may exist when the group call was released, a group call release message was neither sent nor received, and a group call probe message was sent.

The terminal may calculate a periodic call announcement timer. For example, the terminal may generate a random number X with a uniform distribution between 0 and 1. The terminal may set a timer TFG2 (a periodic announcement) based on the random number X using the following Equation 1.

$$TFG2 = \text{call refresh interval} * (2/3 + 2/3 * X) \qquad [\text{Equation 1}]$$

Also, the terminal may calculate the call announcement timer after a call probe. For example, the terminal may set the timer TFG2 (the periodic announcement) based on the random number X with a uniform distribution between 0 and 1 after the call probe using the following Equation 2.

$$TFG2 = 1/12 * X \qquad [\text{Equation 2}]$$

A process of changing a state of the terminal in the state diagram according to the MCPTT service will be described below with reference to FIG. 2.

<Call Probe>

Originating Terminal Call Probe

Upon reception of an indication from the MCPTT user of the terminal to initiate a group call for an MCPTT group ID (211) in the state S1 (210), the terminal may operate as follows.

1) The terminal may store the MCPTT group ID as the MCPTT group ID of the call.

2) The terminal may generate a group call probe message. In the group call probe message, the stored MCPTT group ID of the call may be set as an MCPTT group ID IE.

3) The terminal may send the group call probe message.

4) The terminal may start a timer TFG3 for a call probe retransmission time.

5) The terminal may start a timer TFG1 for a timer call announcement waiting time.

6) The terminal may enter the state S2 (220).

Originating Terminal Initiating Call Probe Retransmission.

Upon expiration of the timer TFG3 (221) in the state S2 (220), the terminal may operate as follows.

1) The terminal may generate a group call probe message. In the group call probe message, the stored MCPTT group ID of the call may be set as an MCPTT group ID IE.

2) The terminal may send the group call probe message.

3) The terminal may start the timer TFG3.

4) The terminal may remain in the state S2.

Receiving Group Call Probe Message when Participating in Ongoing Call

Upon reception of a group call probe message with the MCPTT group ID information element (IE) matching the stored MCPTT group ID of the call (231) in the state S3 (230), the terminal may operate as follows.

1) The terminal may start the timer TFG2 that is set according to Equation 2.

2) The terminal may set a stored probe response value to "true."

3) The terminal may remain in the state S3 (230).

<Call Setup>

Response to Group Call Probe Message Not Received

Upon expiration of the timer TFG1 for the call announcement waiting time (225) in the state S2 (220), the terminal may operate as follows.

1) The terminal may stop the timer TFG3 when the timer TFG3 is running.

2) The terminal may generate an SDP body of the call and store the generated SDP body.

3) The terminal generates a random number with a uniform distribution between 0 and 65,535 and stores the generated random number as the call identifier of the call.

4) The terminal may store the originating MCPTT user ID of the call as its own MCPTT user ID.

5) The terminal may set the current universal time coordinated (UTC) time as a call start time of the call.

6) The terminal may set the current UTC time as the last priority change time of the call.

7) The terminal may store its own MCPTT user ID as the last use to change the priority of the call.

8) The terminal may generate a group call announcement message. For example, the terminal may generate the group call announcement message as follows.

a) The terminal may set a call identifier IE of the group call announcement message to the stored call identifier of the call.

b) The terminal may set a call type IE of the group call announcement message to a requested call type. When a stored emergency state is not set to "false," the call type IE may be set to "emergency group call."

c) The terminal may set a refresh interval IE of the group call announcement message to a stored refresh interval of the call.

d) The terminal may store an SDP IE of the group call announcement message as the stored SDP IE of the call.

e) The terminal may set an originating MCPTT user ID IE of the group call announcement message to the stored originating MCPTT user ID of the call.

f) The terminal may set an MCPTT group ID IE of the group call announcement message to the stored MCPTT group ID of the call.

g) The terminal may set a call start time IE of the group call announcement message to a stored call start time.

h) The terminal may set a last priority change time IE of the group call announcement message to the stored last priority change time of the call.

i) The terminal may set a last-user-to-change-priority-user IE of the group call announcement message to the sent originating MCPTT user ID of the call.

j) The terminal may include a confirmation mode indication IE of the group call announcement message.

9) The terminal may send the group call announcement message.

10) The terminal may establish a media session on the basis of the stored SDP body of the call.

11) The terminal may start floor control as an originator.

12) The terminal may start the timer TFG2 that is set based on Equation 1.

13) The terminal may generate a call type control state machine.

14) The terminal may set a call type associated with the call type control state machine to the requested call type. When a stored emergency state is not set to "false," the call type IE may be set to "emergency group call."

15) The terminal may enter the state S3 (230).

Originating Terminal Receiving Group Call Announcement Message

Upon reception of a group call announcement message with the MCPTT group ID IE corresponding to the stored MCPTT group ID of the call (225) in the state S2 (220), the terminal may operate as follows.

1) The terminal may stop the timer TFG3.

2) The terminal may stop the timer TFG1.

3) The terminal may store a value of the SDP IE of the group call announcement message as the SDP body of the call.

4) The terminal may store a value of the call identifier IE of the group call announcement message as the call identifier of the call.

5) The terminal may store a value of the originating MCPTT user ID IE of the group call announcement message as the originating MCPTT user ID of the call.

6) The terminal may store a value of the call start time IE of the group call announcement message as the call start time of the call.

7) The terminal may set a value of the last priority change time IE of the group call announcement message to the last priority change time of the call.

8) The terminal may set a value of the last-user-to-change-priority IE of the group call announcement message to the last user to change the priority of the call.

9) The terminal may establish a media session on the basis of the stored SDP body of the call.

10) The terminal may terminate a floor participant and start call control.

11) The terminal may start the timer TFG2 that is set according to Equation 1.

12) The terminal may generate a call type control state diagram.

13) The terminal may set a call type associated with the call type state diagram as follows. For example, the terminal may set the associated call type to "emergency group call" a) when the requested call type is "emergency group call," b) when the stored emergency state is set to "true," or c) when the call type IE of the received group call announcement message is set to "emergency group call." As another example, the terminal may set the associated call type to "imminent-peril group call" a) when the requested call type is set to "imminent-peril group call and the call type IE of the received group call announcement message is not "emergency group call" or b) when the call type IE of the received group call announcement message is set to "imminent-peril group call." As still another example, the terminal may set the associated call type to "emergency group call" when the requested call type is "basic group call" and the call type IE of the received group call announcement message is set to a basic group call.

14) The terminal may enter the state S3 (230).

Terminal Receiving Group Call Announcement Message when not Participating in Ongoing Call Upon reception of a group call announcement message with an MCPTT group ID IE not corresponding to the stored MCPTT group ID of the call among the plurality of states of the state diagram (213) in the state S1 (210), the terminal may operate as follows.

1) The terminal may store a value of the SDP IE of the group call announcement message as the SDP body of the call.

2) The terminal may store a value of the call identifier IE of the group call announcement message as the call identifier of the call.

3) The terminal may store a value of the originating MCPTT user ID IE of the group call announcement message as the originating MCPTT user ID of the call.

4) The terminal may store a value of the MCPTT group ID IE of the group call announcement message as the MCPTT group ID of the call.

5) The terminal may store a value of the call start time IE of the group call announcement message as the call start time of the call.

6) The terminal may store a value of the last priority change time IE of the group call announcement message as the last priority change time of the call.

7) The terminal may store a value of the last-user-to-change-priority IE of the group call announcement message as the last user to change the priority of the call.

8) When an MCPTT user acknowledgement is required upon reception of a terminating call request, a) the terminal may start a timer TFG4 for a user waiting time, b) the terminal may enter the state S5 when the group call announcement message contains the confirmation mode indication IE (215), and c) the terminal may enter the state S4 when the group call announcement message does not contain the confirmation mode (217).

9) When the MCPTT user acknowledgement is not required upon reception of the terminating call request (213), the terminal may operate as follows.

a) The terminal may establish a media session on the basis of the stored SDP body of the call.

b) The terminal may terminate a call participant and start floor control.

c) When the group call announcement message contains the confirmation mode indication IE, the terminal may generate a group call acceptance message and send the generated group call acceptance message. In the group call acceptance message, the call identifier IE may be set to the stored call identifier of the call, and the originating MCPTT user ID IE may be set to the MCPTT user ID of the terminal. Also, in the group call acceptance message, the call type IE may be set as the call type of the received group call announcement message, the MCPTT group ID IE may be set as the stored MCPTT group ID of the call, and the call start time IE may be set as the stored call start time of the call.

d) The terminal may start the timer TFG2 (a call announcement) that is set according to Equation 1.

e) The terminal may generate a call type control state diagram.

f) The terminal may store a value of the call type IE of the received group call announcement message as the call type associated with the call type control state machine.

g) The terminal may enter the state S3 (230).

MCPTT User of Terminal Receiving Confirmation Indication

Upon reception of an indication that an incoming group call is to be accepted from the MCPTT user of the terminal (251) in the state S5 (250), the terminal may operate as follows.

1) The terminal may establish a media session on the basis of the stored SDP body of the call.

2) The terminal may terminate a floor participant and start floor control.

3) The terminal may generate a group call acceptance message. In the group call acceptance message, the call identifier IE may be set as the stored call identifier of the call, and the originating MCPTT user ID IE may be set as the MCPTT user ID of the terminal. Also, in the group call acceptance message, the call type IE may be set as the call type of the received group call announcement message, and the MCPTT group ID IE may be set as the stored MCPTT group ID of the call.

4) The terminal may send the group call acceptance message.

5) The terminal may start the timer TFG2 that is set according to Equation 1.

6) The terminal may generate a call type control state diagram.

7) The terminal may store a value of the call type IE of the received group call announcement message as the call type associated with the call type control state diagram.

8) The terminal may enter the state S3 (230).

MCPTT User of Terminal Without Confirmation Indication

Upon reception of an indication that an incoming group call is to be accepted from the MCPTT user (241) in the state S4 (240), the terminal may operate as follows.

1) The terminal may establish a media session on the basis of the stored SDP body of the call.

2) The terminal may terminate a floor participant and start floor control.

3) The terminal may start the timer TFG2 that is specified as a predetermined value.

4) The terminal may generate a call type control state diagram.

5) The terminal may store a value of the call type IE of the received group call announcement message as the call type associated with the call type control state diagram.

6) The terminal may enter the state S3 (230).

Receiving Group Call Acceptance Message

Upon reception of a group call acceptance message with the MCPTT group ID IE matching the stored MCPTT group ID of the call (231) in the state S3 (230), the terminal may operate as follows.

1) The terminal may inform the MCPTT user of the terminal about call acceptance.

2) The terminal may remain in the state S3 (230).

MCPTT User Rejecting Call

Upon reception of an indication that an incoming group call is to be rejected from the MCPTT user (253) in the state S5 (250) or upon reception of an indication that an incoming group call is to be rejected from the MCPTT user (243) in the state S4 (240), the terminal may operate as follows.

1) The terminal may stop the timer TFG4.

2) The terminal may start a timer TFG5 for a case in which an incoming call announcement is not present.

3) The terminal may enter the state S6 (260).

MCPTT User Not Acting

Upon expiration of the timer TFG4 (253) in the state S5 (250) or upon expiration of the timer TFG4 (243) in the state S4 (S40), the terminal may operate as follows.

1) The terminal may start the timer TFG5.

2) The terminal may enter the state S6 (260).

<Periodic Group Call Announcement>

Originating Terminal Sending Periodic Call Announcement

Upon expiration of the timer TFG2 (231) in the state S3 (230), the terminal may operate as follows.

1) The terminal may generate a group call announcement message. In the group call announcement message, the call ID IE may be set to the stored call identifier of the call, the call type IE may be stored as the stored current call type associated with the call type control state diagram, and the SDP IE may be set to the stored SDP body of the call. Also, in the group call announcement message, the originating MCPTT user ID IE may be set to the stored originating MCPTT user ID of the call, the MCPTT group ID IE may be set to the stored MCPTT group ID of the call, and the call start time IE may be set to the stored call start time of the call. Also, in the group call announcement message, the last priority change time IE may be set to the stored last priority change time of the call, the last-user-to-change-priority IE may be set to the last user to change the priority of the call, and the probe response IE may be included when the stored probe response value is set to "true."

2) The terminal may send the group call announcement message.

3) When the stored probe response value is set to "true," the terminal may modify the stored probe response value to "false."

4) The terminal may start the timer TFG2 that is set according to Equation 1 (here, the timer TFG2 is not restarted). For example, another timer TFG2 may be started.

5) The terminal may remain in the state S3 (230).

Originating Terminal Receiving Periodic Call Announcement

In the state S3 (230), when a group call announcement message having the MCPTT group ID IE matching the stored MCPTT group ID of the call is received, the call start time IE of the group call announcement message is the same as the stored call start time of the call, the last priority change time IE is the same as the stored last priority change time of the call, the last-user-to-change-priority IE is the same as the stored last user to change the priority of the call, the call identifier IE is the same as the stored call identifier of the call, and the call type IE is the same as the stored current call type associated with the call type control state diagram (231), the terminal may operate as follows.

1) When the terminal sets the stored probe response value to "true" and the group call announcement message contains a probe response IE, the terminal may stop the timer TFG2, set the stored probe response to "false," start the timer TFG2 that is set according to Equation 1, and remain in the state S3 (230).

2) When the stored probe response value is set to "false," the terminal may stop the timer TFG2, start the timer TFG2 set according to Equation 1, and then remain in the state S3 (230).

<Call Release>

MCPTT User Leaving Ongoing Group Call

Upon reception of a group call release indication (233) in the state S3 (230), the terminal may operate as follows.

1) The terminal may release the media session.

2) The terminal may stop the timer TFG4 when the timer TFG4 is running.

3) The terminal may stop the timer TFG2 when the timer TFG2 is running.

4) The terminal may start the timer TFG5.

5) The terminal may remove the call type control state diagram.

6) The terminal may stop floor control.

7) The terminal may enter the state S6 (260).

MCPTT User Leaving Call After Group Call Announcement Message is Sent or Received Upon reception of an indication that the group call is to be released from the MCPTT user (253) in the state S5 (250) or upon reception of an indication that the group call is to be released from the MCPTT (243) in the state S4 (240), the terminal may operate as follows.

1) The terminal may release the media session.

2) The terminal may stop the timer TFG4 when the timer TFG4 is running.

3) The terminal may stop the timer TFG2 when the timer TFG2 is running.

4) The terminal may start the timer TFG5.

5) The terminal may enter the state S6.

Receiving Group Call Announcement Message for Rejected or Released Call

Upon reception of a group call announcement message with the MCPTT group ID IE matching the stored MCPTT group ID of the call (263) in the state S6 (260), the terminal may operate as follows.

1) The terminal may store a value of the SDP IE of the group call announcement message as the SDP body of the call.

2) The terminal may store a value of the call identifier IE of the group call announcement message as the call identifier of the call.

3) The terminal may store a value of the originating MCPTT user ID IE of the group call announcement message as the call identifier of the call.

4) The terminal may store a value of the call start time IE of the group call announcement message as the call start time of the call.

5) The terminal may stop the timer TFG5.

6) The terminal may start the timer TFG5. For example, the terminal restarts the stopped timer TFG5.

7) The terminal may remain in the state S6 (260).

Receiving Start Indication of MCPTT User for Rejected or Released Call

Upon reception of an indication that a group call of the MCPTT group ID matching the stored MCPTT group ID of the call is to be started (261) in the state S6 (260), the terminal may operate as follows.

1) The terminal may stop the timer TFG5.

2) The terminal may establish a media session on the basis of the stored SDP body of the call.

3) The terminal may terminate a call participant and start floor control.

4) The terminal may start the timer TFG2 that is set according to Equation 1.

5) The terminal may generate a call type control state diagram.

6) The terminal may store a value of the call type IE of the last received group call announcement message as the call type associated with the call type control state diagram.

7) The terminal may enter the state S3 (230).

No Group Call Announcement Message for Rejected or Released Call

Upon expiration of the timer TFG5 (265) in the state S6 (260), the terminal may operate as follows.

1) The terminal may release the stored SDP body of the call.

2) The terminal may release the stored call identifier of the call.

3) The terminal may release the stored originating MCPTT user ID of the call.

4) The terminal may release the stored MCPTT group ID of the call.

5) The terminal may release the call start time of the call.

6) The terminal may enter the state S1 (210).

MCPTT User Leaving after Group Call Probe Message is Sent

Upon reception of an indication that the group call is to be released from the MCPTT user (223) in the state S2 (220), the terminal may operate as follows.

1) The terminal may stop the timer TFG3.
2) The terminal may enter the state S7 (270).

MCPTT User Initiating Released Call as Originator

Upon reception of an indication that a group call of the MCPTT group ID matching the stored MCPTT group ID of the call is to be started from the MCPTT user (271) in the state S7 (270), the terminal may operate as follows.

1) The terminal may stop the timer TFG1.
2) The terminal may generate a group call probe message. The MCPTT group ID IE of the group call probe message may be set to the stored MCPTT group ID of the call.
3) The terminal may send the group call probe message.
4) The terminal may start the timer TFG3.
5) The terminal may start the timer TFG1.
6) The terminal may enter the state S2.

Receiving Group Call Announcement Message for Released Call

Upon reception of a group call announcement message with the MCPTT group ID IE matching the stored MCPTT group ID of the call (273) in the state S7 (270), the terminal may operate as follows.

1) The terminal may store a value of the SDP IE of the group call announcement message as the SDP body of the call.
2) The terminal may store a value of the call identifier IE of the group call announcement message as the call identifier of the call.
3) The terminal may store a value of the originating MCPTT user ID IE of the group call announcement message as the originating MCPTT user ID of the call.
4) The terminal may store a value of the call start time IE of the group call announcement message as the call start time of the call.
5) The terminal may stop the timer TFG1.
6) The terminal may start the timer TFG5.
7) The terminal may enter the state S6 (260).

No Group Call Announcement Message for Released Call

Upon expiration of the timer TFG1 (275) in the state S7 (270), the terminal may operate as follows.

1) The terminal may release the stored MCPTT group ID of the call.
2) The terminal may enter the state S1.

Merging Calls (Merging Different Calls)

In the off-network type, terminals may communicate with other terminals in the coverage area of D2D communication. Accordingly, it is necessary to merge two off-network group calls in order to solve a coverage issue made between the fragmented groups in the off-network type.

According to an embodiment, upon reception of a call announcement message with the MCPTT group ID IE matching the stored MCPTT group ID and the originating MCPTT user ID IE different from the stored originating MCPTT user ID of the call in the state S3 (230), the terminal may compare information regarding the stored group call with information included in the received group call announcement message and determine whether the comparison result corresponds to the following cases.

The terminal may determine a case in which 1) the stored current call type associated with the call type control state diagram is a "basic group call" and the value of the call type IE of the group call announcement message is either "imminent-peril group call" or "emergency group call," 2) the stored current call type associated with the call type control state machine is "imminent-peril group call" and the value of the call type IE of the group call announcement message is "emergency group call," 3) the current call type associated with the call type control state machine is equal to the call type IE and the call start time IE is lower than the stored call start time of the call, or 4) the current call type associated with the call type control state machine is equal to the call type IE, the call start time IE is equal to the stored call start time of the call, and the call identifier IE is lower than the stored call identifier of the call.

When any one of the above-described cases is determined, the terminal may operate as follows.

1) The terminal may store a value of the SDP IE of the call announcement message as the SDP body of the call.
2) The terminal may store a value of the call identifier IE of the call announcement message as the call identifier of the call.
3) The terminal may store a value of the originating MCPTT user ID IE of the call announcement message as the originating MCPTT user ID of the call.
4) The terminal may store a value of the call start time IE of the group call announcement message as the call start time of the call.
5) The terminal may adjust a media session on the basis of the stored SDP body of the call.
6) The terminal may stop the timer TFG2.
7) The terminal may start the timer TFG2. For example, the terminal restarts the stopped timer TFG2.
8) The terminal may remain in the state S3 (230).
9) When the current call type associated with the call type control state diagram is not equal to the call type IE of the group call announcement message, the terminal may store the call type IE of the group call announcement message as the call type associated with the call type control state diagram.

Figure 5:
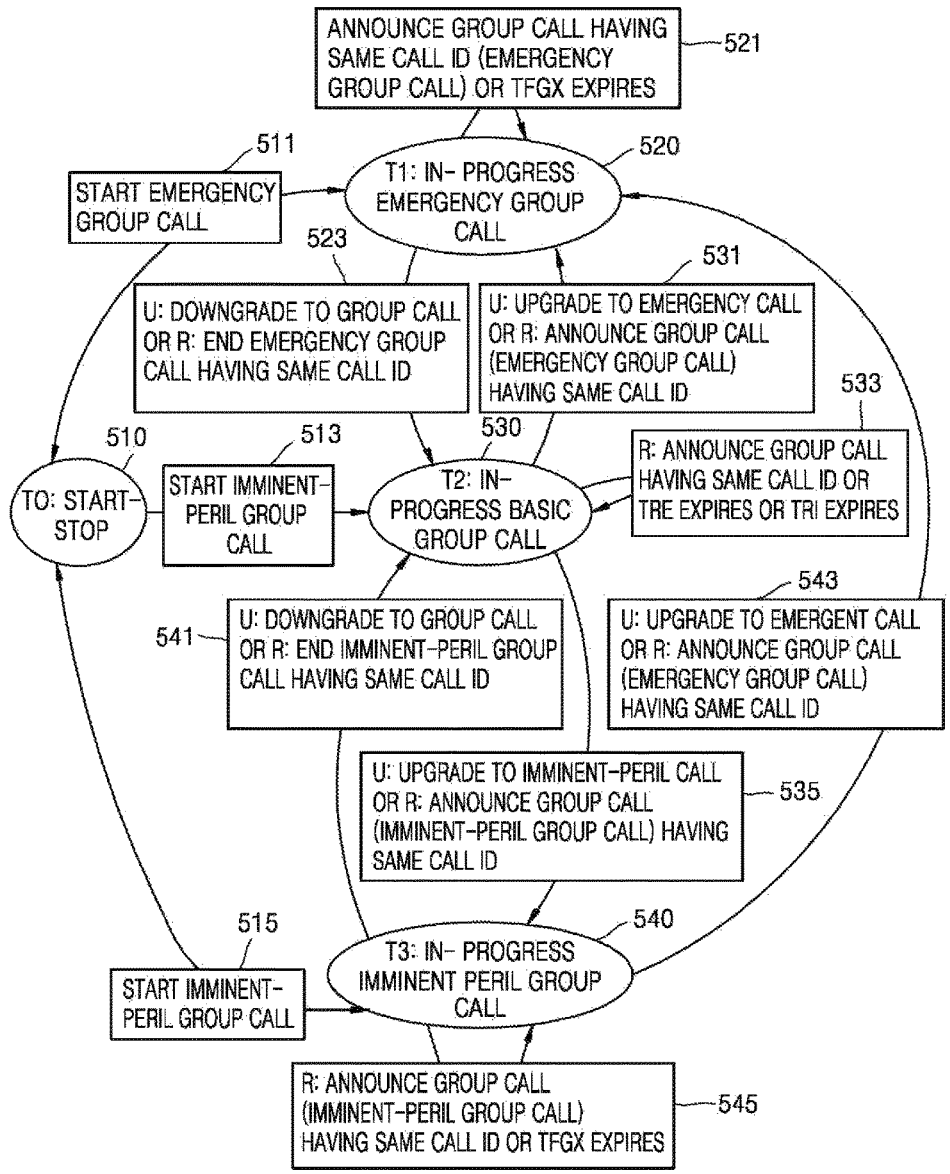
FIG. 5 is a state diagram illustrating a method in which a terminal controls a type of call established according to an MCPTT service according to an exemplary embodiment.

For example, when the stored call type is "emergency group call," the terminal may set a stored current ProSe per-packet priority to an emergency group call priority and may enter a state T1 (corresponding to 520 of FIG. 5). As another example, when the stored call type is "imminent-peril group call," the terminal may set the stored current ProSe per-packet priority to an imminent-peril group call priority and may enter a state T3 (corresponding to 540 of FIG. 5). As still another example, when the stored call type is "basic group call," the terminal may set the stored current ProSe per-packet priority to a basic group call priority and may enter a state T2 (corresponding to 530 of FIG. 5).

10) The terminal may store a value of the last priority change time IE of the group call announcement message as the last priority change time of the call.
11) The terminal may store a value of the last-user-to-change-priority IE of the group call announcement message as the last user to change the priority of the call.
12) The terminal may terminate a floor participant and restart floor control.

When an unexpected MONP message is received, the terminal according to an exemplary embodiment may ignore the received MONP message. Also, when an indication of an unexpected MCPTT user is received, the terminal may ignore the received indication. When a timer unintentionally expires in a specified state, the terminal may ignore the expiration.

Figure 3:
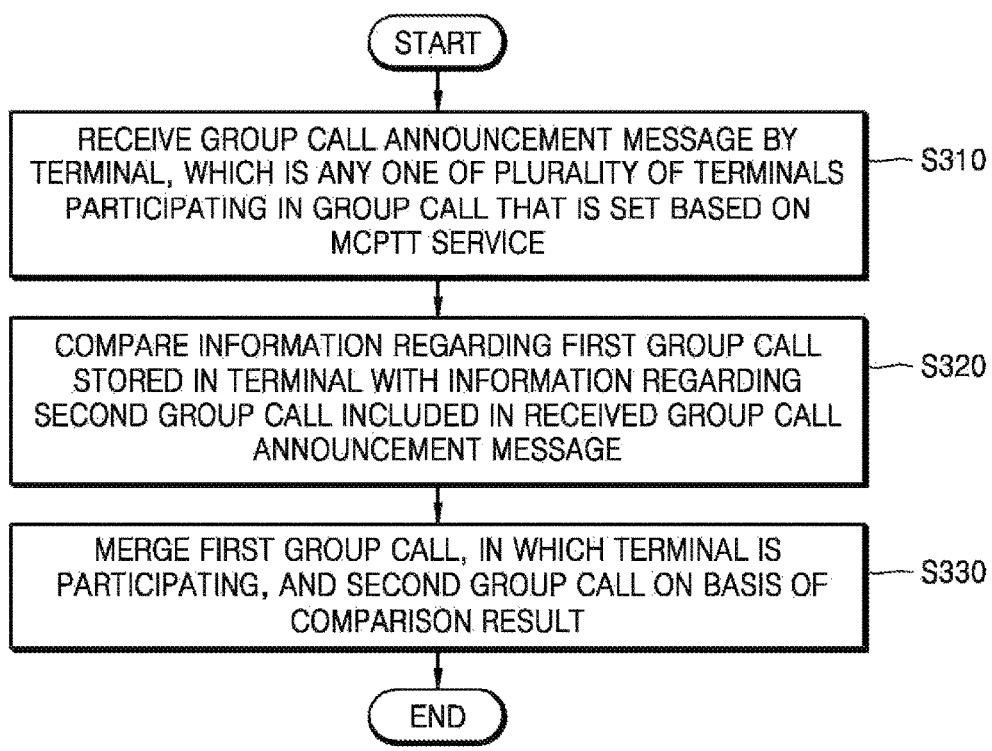
FIG. 3 is a flowchart illustrating a method in which a terminal merges group calls according to an exemplary embodiment.

FIG. 3 is a flowchart illustrating a method in which a terminal merges group calls according to an embodiment.

In S310, any one of a plurality of terminals participating in a group call that is set based on an MCPTT service may receive a group call announcement message. For example, a terminal may receive the group call announcement message in the state S3 (230) that has been described above with reference to FIG. 2. Here, a group call in which the terminal is participating is referred to as a first group call, and a call of the received group call announcement message is referred to as a second group call.

In S320, the terminal may compare prestored information regarding the first group call with information regarding the second group call contained in the received group call announcement message. For example, the terminal may compare at least one of a group ID, a call type, an originating user ID, a call start time, and a call identifier of the first group call with that of the second group call.

In S330, the terminal may merge the first group call, in which the terminal is participating, and the second group call on the basis of a result of the comparison.

When a result of the comparison is that the second group call has a higher call type priority, an earlier call start time, or a smaller call identifier value than the first group call, the terminal according to an exemplary embodiment may merge the first group call into the second group call. For example, the terminal may change the stored information regarding the first group call to the information regarding the second group call.

An emergency group call may have the highest call type priority, an imminent-peril group call may have the second highest call type priority, and a basic group call may have the lowest call type priority. However, this is merely an example embodiment, and the call type priority is not limited to the above-described embodiment.

Figure 4:
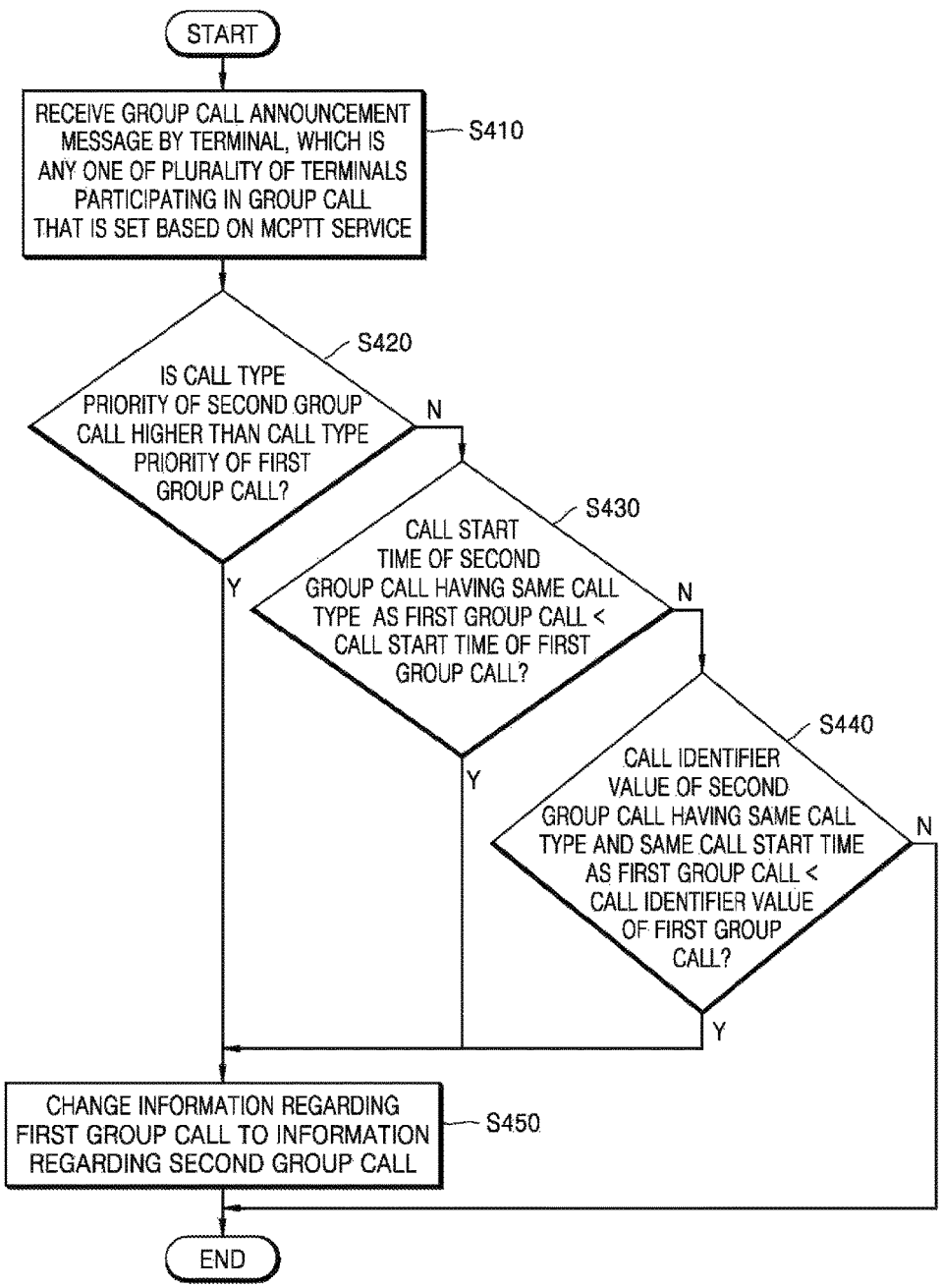
FIG. 4 is a detailed flowchart illustrating a method in which a terminal merges group calls according to an exemplary embodiment.

FIG. 4 is a detailed flowchart illustrating a method in which a terminal merges group calls according to an embodiment.

In S410, any one of a plurality of terminals participating in a group call that is set based on an MCPTT service may receive a group call announcement message.

S410 may correspond to S310, which has been described above with reference to FIG. 3.

In S420, the terminal may determine whether a call type priority of the second group call is higher than a call type priority of the first group call. In this embodiment, it is assumed that the first group call and the second group call have the same group ID and different originating user IDs.

For example, the terminal may determine whether a call type of the first group call is a basic group call and whether a call type of the second group call is higher than that of the first group call, that is, an emergency group call or an imminent-peril group call. As another example, the terminal may determine whether the call type of the first group call is an imminent-peril group call and whether the call type of the second group call is an emergency group call.

In S430, the terminal may determine whether a call start time of the second group call having the same call type as the first group call is earlier than that of the first group call. When the first group call and the second group call have the same call type, the terminal may compare the call start times of the first group call and the second group call.

In S440, the terminal may determine whether a call identifier of the second group call having the same call type and the same call start time as the first group call has a smaller value than that of the first group call. When the first group call and the second group call have the same call start time, the terminal may compare the call identifiers of the first group call and the second group call.

In S450, the terminal may change the information regarding the first group call to the information regarding the second group call.

When the first group call and the second group call have the same group ID, the first group call and the second group call have different originating user IDs, and the call type of the second group call has a higher priority than that of the first group call, the terminal according to an exemplary embodiment may change the prestored information regarding the first group call to the information regarding the second group call.

When the first group call and the second group call have the same group ID and the same call type, the first group call and the second group call have different originating user IDs, and the call start time of the second group call is earlier than that of the first group call, the terminal according to an exemplary embodiment may change the prestored information regarding the first group call to the information regarding the second group call.

When the first group call and the second group call have the same group ID, the same call type, and the same call start time, the first group call and the second group call have different originating user IDs, and the call identifier of the second group call has a smaller value than that of the first group call, the terminal according to an exemplary embodiment may change the prestored information regarding the first group call to the information regarding the second group call.

FIG. 5 is a state diagram illustrating a method in which a terminal controls a type of call established according to an MCPTT service according to an embodiment.

The state diagram shown in FIG. 5 may exist when a terminal is part of an ongoing group call. Also, a call control state diagram may exist for each MCPTT group ID. Also, information regarding a call type and information regarding a ProSe per-packet priority may exist in association with the call control state diagram.

In this embodiment, a start-stop state (hereinafter referred to as a state T0) (510) indicates a start step of the state diagram. An in-progress emergency group call state (hereinafter referred to as the state T1) (520) may exist when the terminal is part of an in-progress emergency group call. An in-progress basic group call state (hereinafter referred to as the state T2) (530) may exist when the terminal is part of an in-progress basic group call. An in-progress imminent-peril group call state (hereinafter referred to as the state T3) (540) may exist when the terminal is part of an in-progress imminent-peril group call.

<Call Initiation of User>

When an emergency group call is initiated (511) in the state T0 (510), the terminal according to an exemplary embodiment may set a current ProSe per-packet to the emergency group call priority and then enter the state T1 (520). According to another embodiment, when an imminent-peril group call is initiated (515) in the state T0 (510), the terminal may set the current ProSe per-packet to the imminent-peril group call priority and then enter the state T3 (540). According to still another embodiment, when a basic group call is initiated (513) in the state T0 (510), the terminal may set the current ProSe per-packet to the basic group call priority and then enter the state T2 (530).

<Upgrade Call>

Originating User Upgrading Call

Upon reception of an indication that a call is to be upgraded from a user in the state T2 (530) or the state T3 (540), the terminal may operate as follows.

1) When an indication that the call is to be upgraded to an emergency group call is received from the user (531) in the state T2 (530) or when an indication that the call is to be upgraded to the emergency group call is received from the user (543) in the state T3 (540), the terminal may set the current call type to "emergency group call," set the current ProSe per-packet priority to the emergency group call priority, and then enter the state T1 (520).

2) When an indication that the call is to be upgraded to an imminent-peril group is received from the user (535) in the state T2 (530), the terminal may set the current call type to "imminent-peril group call," set the current ProSe per-packet priority to the imminent-peril group call priority, and then enter the state T3 (540).

3) The terminal may store the current UTC time as the last priority change time of the call.

4) The terminal may store its own MCPTT user ID as the last user to change the priority of the call.

5) The terminal may generate a group call announcement message. In the group call announcement message, the call ID IE may be set to the stored call identifier of the call in association with a basic call control state machine, the call type IE may be stored as the stored current call type, and the SDP IE may be set to the stored SDP body of the call in association with a basic call control state diagram. In the group call announcement message, the originating MCPTT user ID IE may be set to the stored originating MCPTT user ID of the call, the MCPTT group ID IE may be set to the stored MCPTT group ID of the call, and the call start time IE may be set to the stored call start time of the call. Also, in the group call announcement message, the last priority change time IE may be set to the stored last priority change time of the call, and the last-user-to-change-priority IE may be set to the stored last user ID of the call.

6) The terminal may send the group call announcement message.

Receiving Group Call Announcement Message when Participating in Ongoing Call

Upon reception of a group call announcement message with the MCPTT group IE corresponding to the MCPTT group ID of the ongoing call and the call identifier IE being the same as the stored call identifier of the call in the state T1 (520), the state T2 (530), or the state T3 (540), the terminal may operate as follows.

1) When the stored last user to change the priority of the call is the same as the last-user-to-change-priority IE of the group call announcement message and the stored last priority change time is smaller than the last priority change time IE of the group call announcement message, a) the terminal may set the stored last priority change time of the call to the last priority change time IE of the group call announcement message, b) when the call type IE of the received group call announcement message is set to the emergency group call and the stored call type is not an emergency group call (531 or 543), the terminal may set the current call type to the emergency group call, set the stored current ProSe per-packet priority to the emergency group call priority, and enter the state T1 (520), c) when the call type IE of the received group call announcement message is set to the imminent-peril group call and the stored call type is not an imminent-peril group call (535), the terminal may set the stored current call type to the imminent-peril group call, set the stored current ProSe per-packet priority to the imminent-peril group call priority, and enter the state T3 (540), and d) when the call type IE of the received group call announcement message is set to the basic group call and the stored call type is not a basic group call, the terminal may set the stored current call type to the basic group call, set the stored current ProSe per-packet priority to the basic group call priority, and enter the state T2 (530).

2) When the last user to change the priority of the call is different from the last-user-to-change-priority IE of the group call announcement message, a) when the stored call type is the same as the call type IE of the received group call announcement message and the stored last priority change time is smaller than the last priority change time IE of the group call announcement message, the terminal may set the stored last priority change time of the call to the last priority change time IE of the group call announcement message, b) when the call type IE of the received group call announcement message is an emergency group call and the stored call type is not an emergency group call, the terminal may set the stored last priority change time of the call to the last priority change time IE of the group call announcement message, set the stored last user to change the priority of the call to the last-user-to-change-priority IE of the group call announcement message, set the stored current call type to "emergency group call," set the stored current ProSe per-packet priority to the emergency group call priority, and then enter the state T1 (520), and c) when the call type IE of the received group call announcement message is an imminent-peril group call and the stored call type is a basic group call, the terminal may set the last priority change time of the call to the last priority change time IE of the group call announcement message, set the last user to change the priority of the call to the last-user-to-change-priority IE of the group call announcement message, set the stored current call type to "imminent-peril group call," set the current ProSe per-packet priority to the imminent-peril group call priority, and then enter the state T3 (540).

<Downgrade Call>

Originating User Downgrading Emergency Group Call

Upon reception of a request to downgrade the emergency group call from the user (523) in the state T1 (520), the terminal may operate as follows.

1) The terminal may set the current call type to the basic group call.

2) The terminal may set the current ProSe per-packet priority to the basic group call priority.

3) The terminal may set the current UTC time as the last priority change time of the call.

4) The terminal may store its own MCPTT user ID as the last user to change the priority of the call.

5) The terminal may generate a group call emergency end message. In the group call emergency end message, the call identifier IE may be set to the stored call identifier of the call associated with the basic call control state machine, the originating MCPTT user ID IE may be set to the originating MCPTT user ID of the call associated with the basic call control state diagram, and the MCPTT group ID IE may be set to the MCPTT group ID of the call associated with the basic call control state machine.

In the group call emergency end message, the last priority change time IE may be set to the stored last priority change time of the call, and the last-user-to-change-priority IE may be set to the stored last user to change the priority of the call.

6) The terminal may send the group call emergency end message.

7) The terminal may start a timer TFG11 (an emergency end retransmission) for an emergency end retransmission time.

8) The terminal may enter the state T2 (530).

Retransmitting Group Call Emergency End

Upon expiration of a timer TFG11 (533) in the state T2 (530), the terminal may operate as follows.

1) The terminal may generate a group call emergency end message. In the group call emergency end message, the call identifier IE may be set to the call identifier of the call associated with the basic call control state diagram, the originating MCPTT user ID IE may be set to the originating MCPTT user ID of the call associated with the basic call control state machine, and the MCPTT group ID IE may be set to the MCPTT group ID of the call associated with the basic call control state machine. Also, in the group call emergency end message, the last priority change time IE may be set to the stored last priority change time of the call, and the last-user-to-change-priority IE may be set to the stored last user to change the priority of the call.

2) The terminal may send the group call emergency end message.

3) The terminal may start the timer TFG11 (the emergency end retransmission) when the associated counter is less than N.

4) The terminal may remain in the state T2 (530).

User Downgrading Emergency Group Call

Upon reception of a group call emergency end message (523) in the state T1 (520), the terminal may operate as follows.

1) The terminal may set the stored last priority change time to the last priority change time IE of the received group call emergency end message.

2) The terminal may set the stored last user to change the priority of the call to the last-user-to-change-priority IE of the received group call emergency end message.

3) The terminal may set the current call type to the basic group call.

4) The terminal may set the current ProSe per-packet priority to the basic group call priority.

5) The terminal may enter the state T2 (530).

User Downgrading Imminent-Peril Group Call

Upon reception of an indication that an imminent-peril group call is to be downgraded from the user (543) in the state T3 (540), the terminal may operate as follows.

1) The terminal may set the current call type to the basic group call.

2) The terminal may set the current ProSe per-packet priority to the basic group call priority.

3) The terminal may set the current UTC time as the last priority change time of the call.

4) The terminal may store its own MCPTT user ID as the last user to change the priority of the call.

5) The terminal may generate a group call imminent-peril end message. In the group call imminent-peril end message, the call identifier IE may be set to the stored call identifier of the call associated with the basic call control state machine, the originating MCPTT user ID IE may be set to the originating MCPTT user ID of the call associated with the basic call control state machine, and the MCPTT group ID IE may be set to the MCPTT group ID of the call associated with the basic call control state machine. In the group call imminent-peril end message, the last priority change time IE may be set to the stored last priority change time of the call, and the last-user-to-change-priority IE may be set to the stored last user to change the priority of the call.

6) The terminal may send the group call imminent-peril end message.

7) The terminal may start a timer TFG12 for an imminent-peril end retransmission time.

8) The terminal may enter the state T2 (530).

Retransmitting Group Call Imminent-Peril End

Upon expiration of the timer TFG12 (533) in the state T2 (530), the terminal may operate as follows.

1) The terminal may generate a group call imminent-peril end message. In the group call imminent-peril end message, the call identifier IE may be set to the call identifier of the call associated with the basic call control state machine, the originating MCPTT user ID IE may be set to the originating MCPTT user ID of the call associated with the basic call control state machine, and the MCPTT group ID IE may be set to the MCPTT group ID of the call associated with the basic call control state machine. In the group call imminent-peril end message, the last priority change time IE may be set to the last priority change time of the call, and the last-user-to-change-priority IE may be set to the last user to change the priority of the call.

2) The terminal may send the group call imminent-peril end message.

3) The terminal may start the timer TFG12 for an imminent-peril end retransmission time when the associated counter is less than M.

4) The terminal may remain in the state T2 (530).

Terminating User Downgrading Imminent-Peril Group Call

Upon reception of a group call imminent-peril end message (541) in the state T3 (540), the terminal may operate as follows.

1) The terminal may set the stored last priority change time to the last priority change time IE of the received group call imminent-peril end message.

2) The terminal may set the stored last user to change the priority of the call to the last-user-to-change-priority IE of the received group call imminent-peril end message.

3) The terminal may set the current call type to the basic group call.

4) The terminal may set the current ProSe per-packet priority to the basic group call priority.

5) The terminal may enter the state T2 (530).

Resetting Timer TFGx (Implicit Downgrade)

Upon reception of a group call announcement message with the last-user-to-change-priority IE being the same as the stored last user to change the priority of the call in the state T1 or T3, the terminal may restart the timer TFGx and then remain in the current state. Here, implicit downgrade or upgrade indicates the downgrade or the upgrade is performed according to a predetermined timer.

Ending Implicit Priority

Upon expiration of the timer TFGx in the state T1 (520) or upon expiration of the timer TFGx (implicit downgrade) in the state T3 (540), the terminal may operate as follows.

1) The terminal may set the current UTC time as the stored last priority change time of the call.

2) The terminal may store the originating MCPTT user ID as the last user to change the priority of the call.

3) The terminal may set the current call type to the basic group call.

4) The terminal may set the current ProSe per-packet priority to the basic group call priority.

5) The terminal may enter the state T2 (530).

When an unexpected MONP message is received, the terminal according to an exemplary embodiment may ignore the received MONP message. Also, when an indication of an unexpected MCPTT user is received, the terminal may ignore the received indication. When a timer unintentionally expires in a specified state, the terminal may ignore the expiration.

FIG. 6 is a table illustrating content 600 included in a group call probe message according to an embodiment.

The group call probe message according to an exemplary embodiment may be sent by a terminal to other terminals to check for an ongoing group call. The content 600 of the group call probe message may include an IE 610, a type/reference 620, presence 630, a format 640, and a length 650. The group call probe message may be transmitted from a terminal to the other terminals.

FIG. 7 is a table illustrating content 700 included in a group call announcement message according to an embodiment.

The group call announcement message according to an exemplary embodiment may be sent by a terminal to other terminals to announce an ongoing group call to the other terminals. The content 700 of the group call announcement message may include an IE 710, a type/reference 720, presence 730, a format 740, and a length 750. The group call announcement message may be transmitted from the terminal to the other terminals.

FIG. 8 is a table illustrating content 800 included in a group call acceptance message according to an embodiment.

The group call acceptance message according to an exemplary embodiment may be sent by a terminal to other terminals to indicate that a group call is accepted. The content 800 of the group call acceptance message may include an IE 810, a type/reference 820, presence 830, a format 840, and a length 850. The group call acceptance message may be transmitted from the terminal to the other terminals.

FIG. 9 is a table illustrating content 900 included in a group call imminent-peril end message according to an embodiment.

The group call imminent-peril end message according to an exemplary embodiment may be sent by a terminal to other terminals to indicate that an imminent-peril mode is terminated. The content 900 of the group call imminent-peril end message may include an IE 910, a type/reference 920, presence 930, a format 940, and a length 950. The group call imminent-peril end message may be transmitted from the terminal to the other terminals.

FIG. 10 is a table illustrating content 1000 included in a group call emergency end message according to an embodiment.

The group call emergency end message according to an exemplary embodiment may be sent by a terminal to other terminals to indicate that an emergency mode is terminated. The content 1000 of the group call emergency end message may include an IE 1010, a type/reference 1020, presence 1030, a format 1040, and a length 1050. The group call emergency end message may be transmitted from the terminal to the other terminals.

Figure 11:
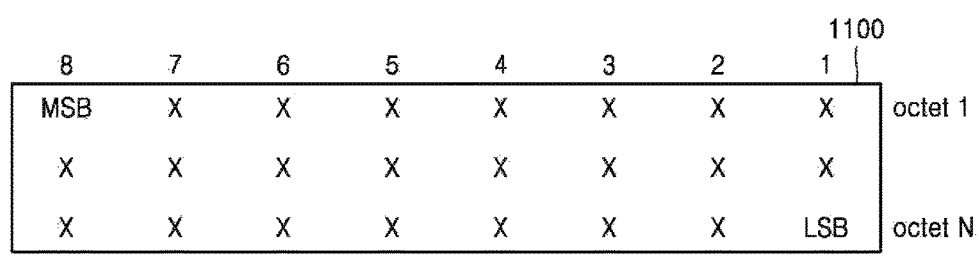
FIGS. 11 and 12 are diagrams illustrating formats and information elements (IEs) of messages used in an MCPTT service.
Figure 12:
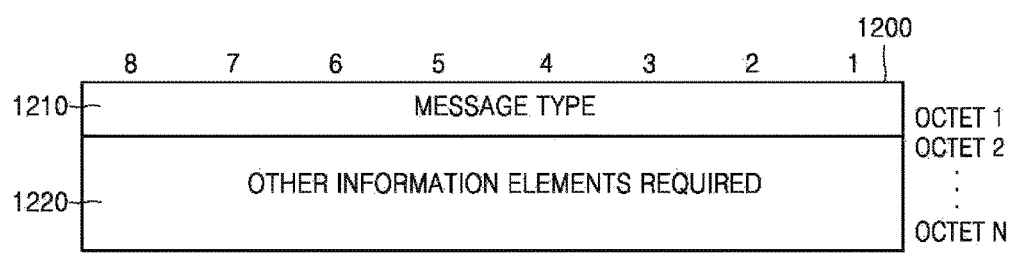

FIGS. 11 and 12 are diagrams illustrating formats and information IEs of messages used in an MCPTT service.

Referring to FIG. 11, the least significant bit of a field may be represented by the lowest numbered bit of the highest numbered octet of the field. When the field extends over more than one octet, the order of bit values progressively decreases as the octet number increases.

Referring to a message format 1200 shown in FIG. 12, within a protocol defined according to an embodiment, a message may include a message type IE 1210 and other necessary information 1220. Also, a terminal that sends the message may set a value of a spare bit to zero in the message.

FIG. 13 is a table 1300 illustrating a message type according to an embodiment.

The purpose of a message type IE is to provide information used by the terminal to identify the type of message. The value of the message type IE may have a length of 1 octet. The message type may include a group call probe message, a group call announce message, a group call acceptance message, a group call emergency end message, a group call imminent-peril end message, a group call broadcast message, and a group call broadcast end message.

FIG. 14 is a diagram illustrating a call identifier according to an embodiment.

Referring to FIG. 14, a call identifier IE 1400 may be provided to uniquely identify a call. The call identifier IE 1400 may have a length of 2 octets.

FIG. 15 is a diagram illustrating a refresh interval according to an embodiment.

Referring to FIG. 15, a refresh interval IE 1500 may be used to indicate the minimum time period between successive periodic messages. The refresh interval IE 1500 may have a length of 2 octets.

Figure 16:
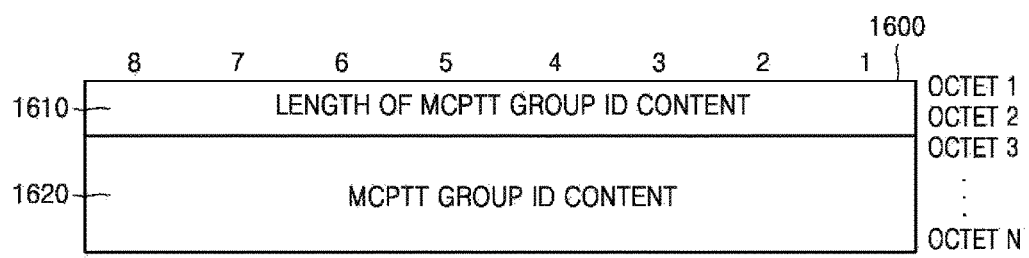
FIG. 16 is a diagram illustrating an MCPTT group ID according to an exemplary embodiment.

FIG. 16 is a diagram illustrating an MCPTT group ID according to an embodiment.

Referring to FIG. 16, an MCPTT group ID IE 1600 may be used to indicate a destination of an MCPTT group identifier. The MCPTT group ID IE 1600 may include an area 1610 indicating a length of content of the MCPTT group ID and an area 1620 indicating the content of the MCPTT group ID.

Figure 17:
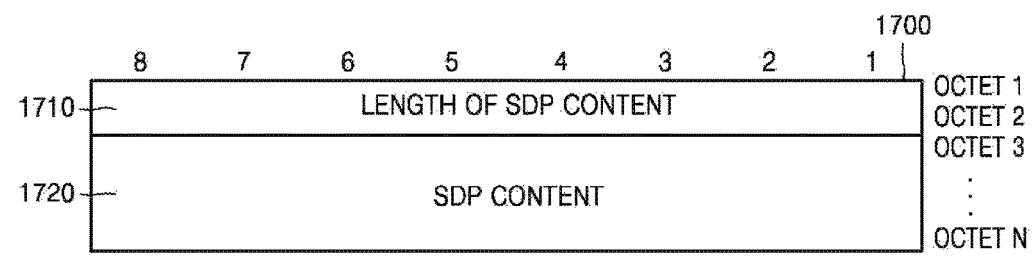
FIG. 17 is a diagram illustrating the Session Description Protocol (SDP) according to an exemplary embodiment.

FIG. 17 is a diagram illustrating the SDP according to an embodiment.

Referring to FIG. 17, an SDP IE 1700 may be used to provide an SDP message. The SDP IE 1700 may include an area 1710 indicating a length of content of the SDP and an area 1720 indicating the content of the SDP.

Figure 18:
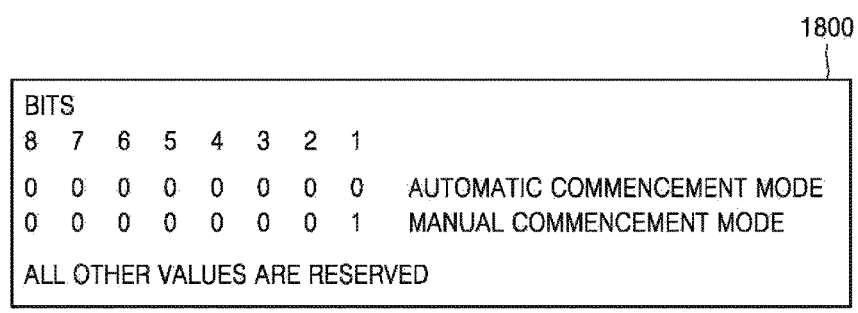
FIG. 18 is a table illustrating a commencement mode according to an exemplary embodiment.

FIG. 18 is a table 1800 illustrating a commencement mode according to an embodiment.

Referring to FIG. 18, a commencement mode IE may be used to identify a type of commencement mode of a private call. The commencement mode IE may include an automatic commencement mode and a manual commencement mode.

Figure 19:
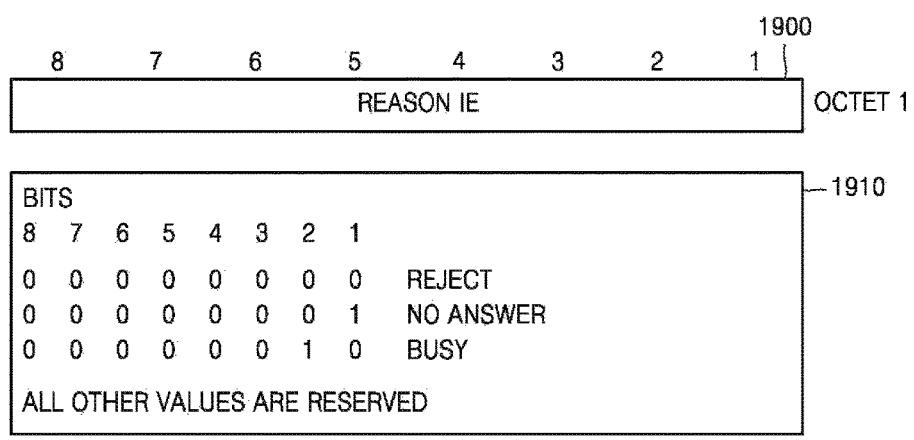
FIG. 19 is a diagram illustrating a reason IE according to an exemplary embodiment.

FIG. 19 is a diagram illustrating a reason IE 1900 according to an embodiment.

Referring to FIG. 19, the reason IE 1900 may be provided to indicate a reason for rejection. Referring to a table 1910 indicating a value of the reason IE 1900, values indicating rejection, no answer, and busy may be used in the reason IE 1900.

Figure 20:
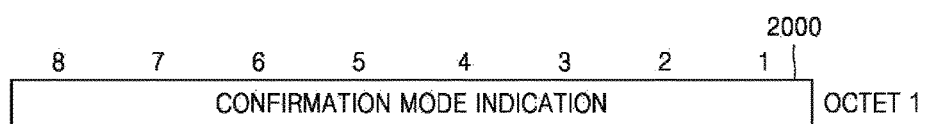
FIG. 20 is a table illustrating a confirmation mode indication according to an exemplary embodiment.

FIG. 20 is a table illustrating a confirmation mode indication according to an embodiment.

Referring to FIG. 20, a confirmation mode indication IE 2000 may be used to indicate that an MCTPP user is expected to confirm call acceptance. The confirmation mode indication IE 2000 may have a length of 1 octet.

Figure 21:
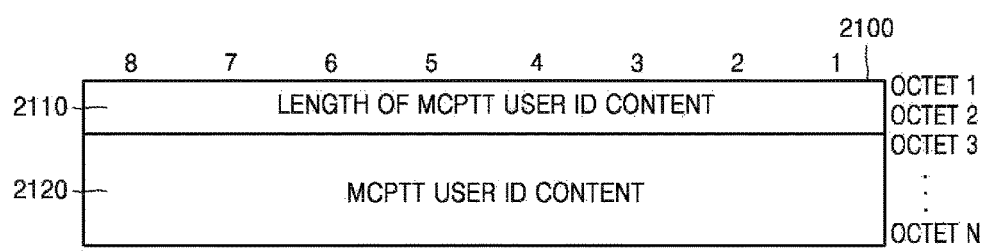
FIG. 21 is a diagram illustrating an MCPTT user ID according to an exemplary embodiment.

FIG. 21 is a diagram illustrating an MCPTT user ID according to an embodiment.

Referring to FIG. 21, an MCPTT user ID IE 2100 may be used to indicate an MCPTT user ID. The MCPTT user ID IE 2100 may include an area 2110 indicating a length of content of the MCPTT user ID and an area 2120 indicating the content of the MCPTT user ID.

Figure 22:
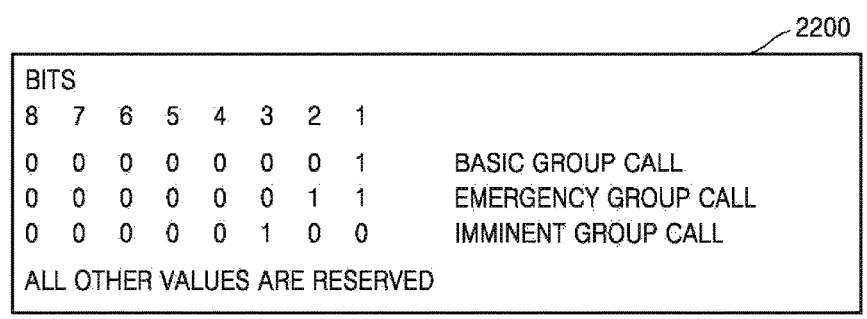
FIG. 22 is a table illustrating a call type according to an exemplary embodiment.

FIG. 22 is a table 2200 illustrating a call type according to an embodiment.

Referring to FIG. 22, a call type IE may be used to define a call type. The call type may include a basic group call, an emergency group call, and an imminent-peril group call.

Figure 23:
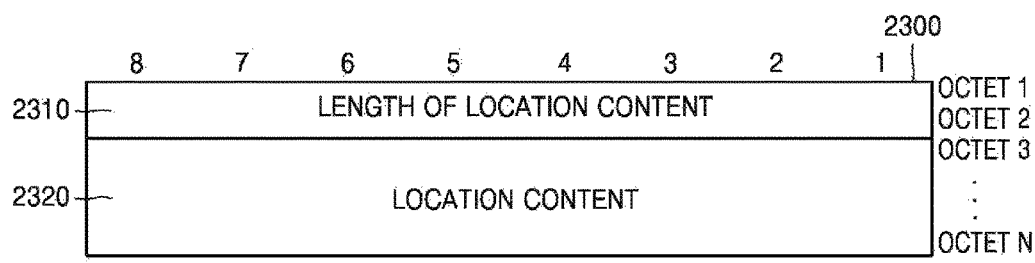
FIG. 23 is a diagram illustrating a location IE according to an exemplary embodiment.

FIG. 23 is a diagram illustrating a location IE 2300 according to an embodiment.

Referring to FIG. 23, the location IE 2300 may be used to indicate a current location of a terminal. The location IE 2300 may include an area 2310 indicating a length of content of the location and an area 2320 indicating the content of the location.

Figure 24:
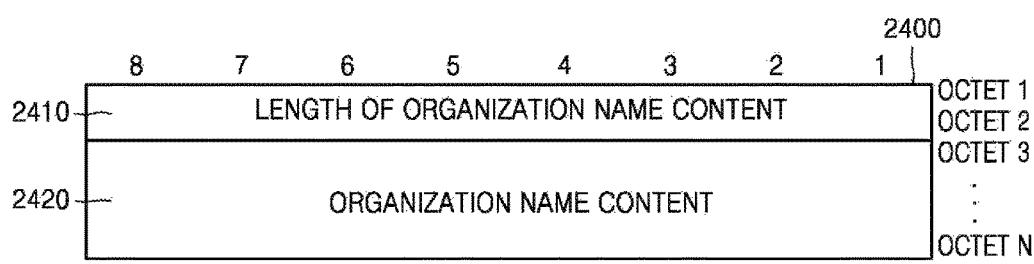
FIG. 24 is a diagram illustrating an organization name IE according to an exemplary embodiment.

FIG. 24 is a diagram illustrating an organization name IE 2400 according to an embodiment.

Referring to FIG. 24, the organization name IE 2400 may be used to indicate a name of an organization to which any user belongs. The organization name IE 2400 may include an area 2410 indicating a length of content of the organization name and an area 2420 indicating the content of the organization name.

Figure 25:
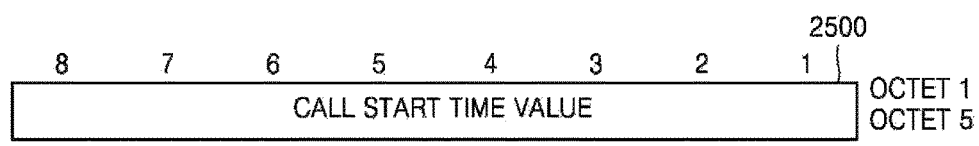
FIG. 25 is a diagram illustrating a call start time IE according to an exemplary embodiment.

FIG. 25 is a diagram illustrating a call start time IE 2500 according to an embodiment.

Referring to FIG. 25, the call start time IE 2500 may be used to indicate a UTC time when a call is started. The call start time IE 2500 may have a length of 5 octets.

Figure 26:
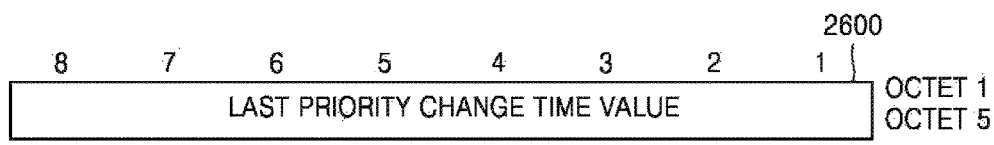
FIG. 26 is a diagram illustrating a last priority change time IE according to an exemplary embodiment.

FIG. 26 is a diagram illustrating a last priority change time IE 2600 according to an embodiment.

Referring to FIG. 26, the last priority change time IE 2600 may be used to indicate a UTC time when a call is changed. The last priority change time IE 2600 may have a length of 5 octets.

Figure 27:
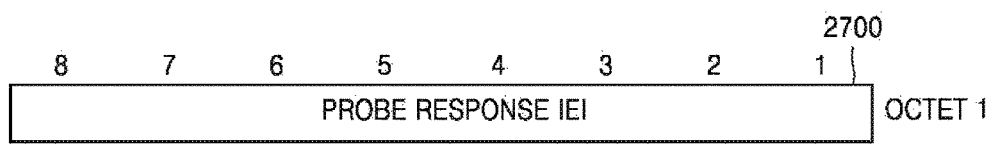
FIG. 27 is a diagram illustrating a probe response IE according to an exemplary embodiment.

FIG. 27 is a diagram illustrating a probe response IE 2700 according to an embodiment.

Referring to FIG. 27, the probe response IE 2700 may be used to indicate that a group call announcement message is sent in response to a group call probe message. The probe response IE 2700 may have a length of 1 octet.

Figure 28:
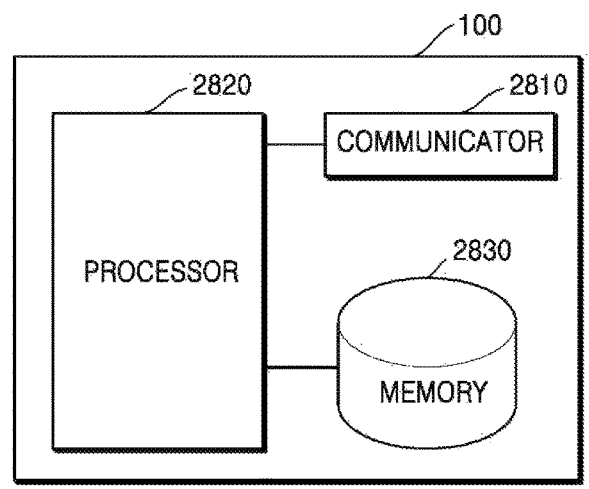
FIG. 28 is a block diagram showing a terminal according to an exemplary embodiment.

FIG. 28 is a block diagram showing the terminal 100 according to an embodiment.

The terminal 100 may include a communicator 2810, a processor 2820, and a memory 2830.

The communicator 2810 is connected to the processor 2820 and configured to transmit or receive signals in a wireless manner. For example, the communicator 2810 may receive a group call announcement message.

The processor 2820 may implement the functions, processes, and/or methods that have been proposed herein. The above-described operation of the terminal 100 may be implemented by the processor 2820. The processor 2820 according to an exemplary embodiment may perform a process such as call initiation, call state change, call merging, call upgrade, or call downgrade in an MCPTT service, as described above in reference to FIGS. 1 to 27. In an exemplary embodiment, the processor 2820 includes a plurality of processors.

The processor 2820 may compare information regarding a first group call stored in the terminal with information regarding a second group call included in a received group call announcement message. Also, the processor 2820 may merge the first group call in which the terminal is participating and the second group call on the basis of a result of the comparison.

The processor 2820 according to an exemplary embodiment may compare at least one of a group ID, a call type, an originating user ID, a call start time, and a call identifier of the first group call with that of the second group call.

The processor 2820 may merge the first group call into the second group call when a call type of the second group call has a higher priority than that of the first group call. For example, when the first group call and the second group call have the same group ID, the first group call and the second group call have different originating user IDs, and a call type of the first group call is a basic group call, the processor 2820 may determine whether a call type of the second group call is an emergency group call or an imminent-peril group call. When it is determined that a call type of the second group call is an emergency group call or an imminent-peril group call, the processor 2820 may change the information regarding the first group call stored in the terminal to the information regarding the second group call.

For example, when the first group call and the second group call have the same group ID, the first group call and the second group call have different originating user IDs, and a call type of the first group call is an imminent-peril group call, the processor 2820 may determine whether a call type of the second group call is an emergency group call. When a call type of the second group call is an emergency group call, the processor 2820 may change the information regarding the first group call stored in the terminal to the information regarding the second group call.

When the first group call and the second group call have the same group ID, the same call type, and different originating user IDs, the processor 2820 may determine whether the call start time of the second group call is earlier than the call start time of the first group call. When the call start time of the second group call is earlier than the call start time of the first group call, the processor 2820 may change the information regarding the first group call stored in the terminal to the information regarding the second group call.

When the first group call and the second group call have the same group ID, the same call type, the same call start time, and different originating user IDs, the processor 2820 may determine whether the call identifier of the second group call has a value that is smaller than that of the first group call. When a call identifier of the second group call has a value that is smaller than that of the first group call, the processor 2820 may change the information regarding the first group call stored in the terminal to the information regarding the second group call.

The memory 2830 is connected with the processor 2820 and configured to store a protocol or parameter for the operation.

The processor may include an application-specific integrated circuit (ASIC), other chipsets, logic circuits, and/or data processors. The memory may include a read-only memory (ROM), a random access memory (RAM), flash memories, memory cards, storage media, and/or other storage devices. A radio frequency (RF) unit may include a baseband circuit for processing radio signals. When the above-described exemplary embodiment is implemented in software, the above-described scheme may be implemented using a module (a process or a function) which performs the above functions. The module may be stored in the memory and executed by the processor. The memory may be disposed inside or outside the processor, and may be connected to the processor using a variety of well-known means.

In the above example systems, although the methods have been described on the basis of the flowcharts using a series of steps or blocks, the present disclosure is not limited to the sequence of the steps, and some of the steps may be performed at different sequences from the other steps or may be performed simultaneously with the other steps. Furthermore, those skilled in the art should understand that the steps shown in the flowcharts are not exclusive and may include other steps or that one or more of the steps of the flowcharts may be deleted without affecting the scope of the present disclosure.

The above-described exemplary embodiments include various aspects of examples. Although all possible combination for describing the various aspects have not been described, those skilled in the art may appreciate that other combinations are possible. Accordingly, the present disclosure should be construed to include all other replacements, modifications, and changes which fall within the scope of the claims.

All references, including publications, patent applications, and patents, cited herein are hereby incorporated by reference to the same extent as if each reference was individually and specifically indicated to be incorporated by reference and were set forth in its entirety herein.

For the purposes of promoting an understanding of the principles of the disclosed embodiment, reference has been made to exemplary embodiments illustrated in the drawings, and specific language has been used to describe these embodiments. However, no limitation of the scope of the exemplary embodiments is intended by this specific language, and the disclosed exemplary embodiments should be construed as encompassing all elements that would normally occur to one of ordinary skill in the art.

The disclosed exemplary embodiments may be described in terms of functional block components and various processing steps. Such functional blocks may be realized by any number of hardware and/or software components configured to perform the specified functions. For example, the disclosed exemplary embodiments may employ various integrated circuit (IC) components, e.g., memory elements, processing elements, logic elements, look-up tables, and the like, which may carry out a variety of functions under control of one or more microprocessors or other control devices. Similarly, where the elements of exemplary embodiments are implemented using software programming or software elements, exemplary embodiments may be implemented with any programming or scripting language such as C, C++, Java, assembler language, or the like, with various algorithms implemented with any combination of data structures, objects, processes, routines or other programming elements. Functional aspects may be implemented in algorithms that are executed by one or more processors. Furthermore, the disclosed exemplary embodiments could employ any number of conventional techniques for electronics configuration, signal processing and/or control, data processing, and the like. The terms "mechanism," "element," "means," and "configuration" may be widely used and are not limited to mechanical and physical configurations. Such terms may have the meaning of a series of routines of software in association with a processor or the like.

Specific executions described herein are merely examples and do not limit the scope of the disclosed exemplary embodiments in any way. For simplicity of description, other functional aspects of conventional electronic configurations, control systems, software, and the aforementioned systems may have been omitted. Furthermore, line connections or connection members between elements depicted in the drawings represent functional connections and/or physical or circuit connections by way of example, and they may be replaced or embodied as various additional functional connections, physical connections, or circuit connections in an actual application. Moreover, no element is essential to the practice of the disclosed exemplary embodiments unless specifically described herein as "essential" or "critical."

What is claimed is:

1. A method in which a terminal provides a Mission Critical Push To Talk (MCPTT) service, the method comprising:
   receiving a group call announcement message, by the terminal participating in a group call for the MCPTT service based on a ProSe (Proximity Services) direct communication;
   when a group identifier of the group call announcement message is matched to a group identifier stored in the terminal and an originating user identifier of the group call announcement message is different from an originating user identifier stored in the terminal, comparing a call type stored in the terminal with a call type of the group call announcement message; and
   storing the originating user identifier of the group call announcement message as the originating user identifier of the group call based on a result of the comparison.

2. The method of claim 1, wherein the comparing further comprises comparing at least one of a call start time and a call identifier stored in the terminal for the group call with at least one of a call start time and a call identifier of the group call announcement messages.

3. The method of claim 2, wherein the storing comprises when the call type stored in the terminal is equal to the call type of the group call announcement message and the call start time of the group call announcement message is lower than the call start time stored in the terminal, storing the originating user identifier of the group call announcement message as the originating user identifier of the group call.

4. The method of claim 2, wherein the storing comprises when the call type stored in the terminal is equal to the call type of the group call announcement message, the call start time of the group call announcement message is equal to the call start time stored in the terminal and the call identifier of the group call announcement message is lower than the call identifier stored in the terminal, storing the originating user identifier of the group call announcement message as the originating user identifier of the group call.

5. The method of claim 1, wherein
   the storing comprises when the call type stored in the terminal is a basic group call and the call type of the group call announcement message is an imminent peril group call or an emergency group call,
   storing the originating user identifier of the group call announcement message as the originating user identifier of the group call.

6. The method of claim 1, wherein
   the storing comprises when the call type stored in the terminal is an imminent peril group call and the call type of the group call announcement message is an emergency group call, storing the originating, user identifier of the group call announcement message as the originating user identifier of the group.

7. A non-transitory computer-readable recording medium having a program recorded thereon for executing the method of claim 1.

8. A terminal that provides a Mission Critical Push To Talk (MCPTT) service, the terminal comprising:
   a communicator; and
   a processor configured to:
   participate in a group call for the MCPTT service based on a ProSe (Proximity Services) direct communication,
   control the communicator to receive a group call announcement message, compare a call type stored in the terminal with a call type of the group call announcement message, when a group identifier of the group call announcement message is matched to a group identifier stored in the terminal and an originating user identifier of the group call announcement message is different from an originating user identifier stored in the terminal and store the originating user identifier of the group call announcement message as the originating user identifier of the group call, based on a result of the comparison.

9. The terminal of claim 8, wherein the processor is configured to compare at least one of a call start time, and a call identifier of the group call with at least one of a call start time and a call identifier of the group call announcement message.

10. The terminal of claim 8, wherein the processor configured to store the originating user identifier of the group call announcement message as the originating user identifier of the group call when the call type stored in the terminal is a basic group call and the call type of the group call announcement message is an imminent peril group call or an emergency group call.

11. The terminal of claim 8, wherein the processor configured to store the originating user identifier of the group call announcement message as the originating user identifier of the group call, when the call type stored in the terminal is an imminent peril group call and the call type of the group call announcement message is an emergency group call.

12. The terminal of claim 8, wherein the processor configured to store the originating user identifier of the group call announcement message as the originating user identifier of the group call, when the call type stored in the terminal is equal to the call type of the group call announcement message and the call start time of the group call announcement message is lower than the call start time stored in the terminal.

13. The terminal of claim 8, wherein the processor configured to store the originating user identifier of the group call announcement message as the originating user identifier of the group call, when the call type stored in the terminal is equal to the call type of the group call announcement message, the call start time of the group call announcement message is equal to the call start time stored in the terminal and the call identifier of the group call announcement message is lower than the call identifier stored in the terminal.

* * * * *